United States Patent [19]
Matsui et al.

[11] 3,876,587
[45] Apr. 8, 1975

[54] POWDER COATING COMPOSITIONS

[75] Inventors: Komaharu Matsui; Masaaki Kamimura, both of Hiratsuka, Japan

[73] Assignee: Kansai Paint Company, Limited, Amagasaki-shi, Hyogo-ken, Japan

[22] Filed: Oct. 23, 1973

[21] Appl. No.: 408,274

[30] Foreign Application Priority Data
Oct. 25, 1972  Japan.............................. 47-107382

[52] U.S. Cl. .................... 260/78.4 D; 117/161 UZ; 117/161 UT; 161/174; 260/78.4 EP; 260/80.81; 260/80.75; 260/823
[51] Int. Cl. ........................ C08f 15/40; C08f 27/00
[58] Field of Search... 260/78.4 D, 78.4 EP, 78.5 R, 260/80.81, 80.75

[56] References Cited
UNITED STATES PATENTS

| | | | |
|---|---|---|---|
| 3,557,063 | 1/1971 | D'Alelio.............................. | 260/78.4 |
| 3,654,240 | 4/1972 | D'Alelio.............................. | 260/78.5 |
| 3,741,272 | 6/1973 | Ullrich et al........................ | 159/2 E |

*Primary Examiner*—Joseph L. Schofer
*Assistant Examiner*—John Kight
*Attorney, Agent, or Firm*—Larson, Taylor and Hinds

[57] ABSTRACT

A thermosetting acrylic powder coating composition which comprises an acrylic resin having glycidyl groups in the molecule and a glass transition temperature of 40° to 85°C and at least one of aliphatic dibasic acids, anhydrides thereof and substances producing said dibasic acids under a curing condition; said acrylic resin being a copolymer of 1. 50 to 94.5 weight percent of at least one alkyl esters of acrylic acid or methacrylic acid, 2. 0.5 to 10 weight percent of at least one of hydroxyalkyl esters of acrylic acid or methacrylic acid and 3. 5 to 40 weight percent of at least one of glycidyl acrylate and glycidyl methacrylate; and said aliphatic dibasic acid having the formula of

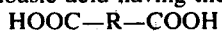

HOOC—R—COOH in which R is a saturated aliphatic hydrocarbon group having 4 to 11 carbon atoms.

9 Claims, No Drawings

POWDER COATING COMPOSITIONS

This invention relates to a thermosetting acrylic powder coating composition, more particularly to a thermosetting acrylic powder coating composition containing a specific thermosetting acrylic resin and curing agent.

In recent years powder coating composition has gained growing interest and has been introduced into practical application. For example, powder coating compositions of epoxy resin or polyvinyl chloride are known in the art. However, the former is poor in weather resistance and is therefore unfit for outdoor use, while the latter is low in adhesiveness to metallic substance, which necessitates the use of primer and renders it difficult to produce thin coating film.

On the other hand, thermosetting acrylic resin has been extensively used as a solvent-type paint to give a coating film having a bright color, excellent weather resistance, excellent color retention, excellent resistance to yellowing and excellent chemical resistance due to the characteristics of the resin. Utilizing the above characteristics of the acrylic resin many attempts have been made to produce thermosetting acrylic powder coating composition, but no useful powder coating composition has been proposed yet. For example, it is known in the art to use an acrylic resin modified with epoxy resin or a hydroxyl-containing acrylic resin modified with melamine resin. However, according to the former resin not only the epoxy resin used is restricted to a specific kind of solid resin but also it is required to use a large amount of epoxy resin, impairing the aforementioned excellent characteristics of acrylic resin. Further, according to the latter resin blistering of the coating film occurs during baking step thereof due to the alcohol produced in the course of cross-linking reaction, this failing to produce a film having smooth surface.

An object of the invention is accordingly to provide a thermosetting acrylic powder coating composition free from the above drawbacks of the prior compositions.

Another object of the invention is to provide a thermosetting acrylic powder coating composition capable of producing a coating film retaining excellent characteristics of the acrylic resin and having bright color, non-yellowing, excellent weather resistance, excellent color retention and excellent chemical resistance.

Another object of the invention is to provide a thermosetting acrylic powder coating composition which can be applied to various substances with an excellent adhesion, rendering the use of primer unnecessary.

Another object of the invention is to provide a thermosetting acrylic powder coating composition capable of producing a coating having smooth surface and desired thickness whether thin or thick and free from undesired blistering.

Another object of the invention is to provide a thermosetting acrylic powder coating composition free from undesired caking during storage even when the storage temperature rises.

The thermosetting acrylic powder coating composition of the present invention comprises an acrylic resin having glycidyl groups in the molecule and having a glas transition temperature of 40° to 85°C and at least one of aliphatic dibasic acids, anhydrides thereof and substances producing said dibasic acids under a curing condition; said acrylic resin being a copolymer of 1. 50 to 94.5 weight percent of at least one species selected from the group consisting of a) alkyl esters of acrylic acid or methacrylic acid represented by the formula of

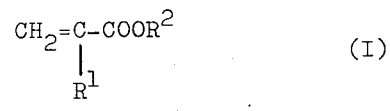

in which $R^1$ is hydrogen atom or methyl group and $R^2$ is an alkyl group having 1 to 17 carbon atoms and b) a 1 : up to 1.5 weight ratio mixture of said alkyl esters and other vinyl monomers, 2. 0.5 to 10 weight percent of at least one of hydroxyalkyl esters of acrylic acid or methacrylic acid represented by the formula of

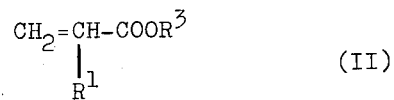

in which $R^1$ is the same as above and $R^3$ is a hydroxyalkyl group having 1 to 4 carbon atoms and 3. 5 to 40 weight percent of at least one of glycidyl acrylate and glycidyl methacrylate; and said aliphatic dibasic acid having the formula of

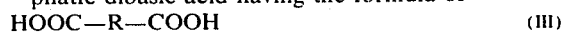

in which R is a saturated aliphatic hydrocarbon group having 1 to 11 carbon atoms.

According to the researches of the present inventors it has been found that when said acrylic resin having glycidyl and hydroxyalkyl groups is used in combination with a specific curing agent, aliphatic dibasic acid and/or anhydride thereof, it is possible to obtain coating film which retains excellent characteristics inherent to acrylic resin. In fact, the coating film obtained from the present powder coating composition is bright in color, and non-yellowing and displays excellent weather resistance, excellent color retention and excellent chemical resistance, which are rather superior to those of the coating film obtained from the conventional solvent-type paint of acrylic resin. According to the present coating composition, moreover, the coating film obtained therefrom is smooth in surface and is excellent in specular gloss, water resistance and humidity resistance. Further, the present powder coating composition can be applied to various articles including metallic articles to produce a coating film strongly adhered to the articles without using any primer. According to the present powder coating composition, moreover, a coating film having a desired thickness can be obtained whether thick or thin free from blistering. For example, not only a thin film of about 30 μ is obtainable but also a thick film of about 200 μ can easily be produced without any formation of blistering. Further the coating film obtained from the present powder coating composition is hard and excellent in abrasion resistance, flexibility and stain resistance. Further, the acrylic resin used in the present invention has a high glass transition temperature of 40° to 85°C, so that undesired caking never occurs even when the storage temperature rises.

The acrylic resin having glycidyl groups used in the invention has a glass transition temperature of 40° to 85°C. When the glass transition temperature of the resin is lower than 40°C undesired caking occurs during storage due to the rise of the temperature, while the resin having a glass transition temperature of higher than 70°C fails to produce a smooth-surfaced coating film. Preferable glass transition temperature of the resin is in the range of 45° to 55°C. The acrylic resin is a copolymer containing 5 to 40 weight percent of glycidyl acrylate and/or glycidyl methacrylate. Another monomers are (1-a) alkyl esters of acrylic acid or methacrylic acid represented by the formula (I) or (1-b) a 1 : up to 1.5 weight ratio mixture of said alkyl esters of the formula (I) and other vinyl monomers and (2) hydroxyalkyl esters of acrylic or methacrylic acid represented by the formula (II) before. The monomer (1-a) or (1-b) is contained in the copolymer in the range of 50 to 94.5 weight percent and the monomer (2) is contained in the range of 0.5 to 10 weight percent. When the copolymer contains less than 5 weight percent of glycidyl esters it results in the production of a coating film inferior in solvent resistence and flexibility, while if the content of glycidyl esters is more than 40 weight percent the resultant coating film is poor in surface-smoothness.

The copolymer contains 0.5 to 10 weight percent of the monomer (2), whereby the surface smoothness and specular gloss of the resultant coating film are markedly improved. If the content of the monomer (2) is lower than 0.5 weight percent the surface smoothness and specular gloss of the coating film are not improved, whereas if the content is more than 10 weight percent the specular gloss rather becomes poor.

The copolymer preferably comprises 10 to 30 weight percent of glycidyl esters, 62 to 88 weight percent of monomer (1-a) or (1-b) and 2 to 8 weight percent of monomer (2). Of these copolymers those comprising glycidyl ester, the monomer (1-a) represented by the formula (I) and monomer (2) are the most preferable.

Preferable examples of the monomer (1-a), i.e., alkyl esters of acrylic acid or methacrylic acid having the formula (I) above are methyl acrylate, methyl methacrylate, butyl acrylate, butyl methacrylate, 2-ethylhexyl acrylate, 2-ethylhexyl methacrylate, octyl acrylate, octyl methacrylate, lauryl methacrylate, dimethylaminomethyl acrylate, dimethylaminoethyl methacrylate, diethylaminoethyl acrylate and diethylamionethyl methacrylalte. The copolymer of glycidyl esters and monomer (1-b), i.e., mixture of alkyl esters of the formula (I) and other vinyl monomers can be used in the invention. Such vinyl monomers are, for example, styrene, acrylonitrile, vinyl acetate and vinyl toluene. The mixture ratio in weight of alkyl esters of the formula (I) and the vinyl monomer is 1: up to 1.5, preferably 1 : up to 1. The monomer (2), i.e, hydroxyalkyl esters of acrylic acid or methacrylic acid to be used in the invention are, for example, 2-hydroxymethylacrylate, 2-hydroxyethylacrylate, 2-hydroxypropylacrylate, 2-hydroxybutylacrylate, 2-hydroxyethylmethacrylate, 2-hydroxypropylmethacrylate and 2-hydroxybutylmethacrylate.

The copolymer used in the invention can be prepared by various known methods, for example, by solution polymerization, pearl polymerization, etc.

It is essential in the invention to use as a curing agent aliphatic dibasic acids having the formula (III) above and anhydrides thereof. Other curing agents such as aliphatic amines, aromatic amines, modified amines, aromatic polybasic acids, etc., can not be used in the invention, since curing reaction occurs during storage or when it is kneaded with the acrylic resin having glycidyl groups at a room temperature of elevated temperature. The aliphatic dibasic acids and anhydrides thereof used in the invention can be homogeneously mixed with the acrylic resin having glycidyl groups in molten state without any undesired curing reaction. The aliphatic dibasic acids are saturated dibasic acids and anhydrides thereof. Preferable examples of the aliphatic dibasic acids are adipic acid, pimelic acid, suberic acid, azelaic acid, sebacic acid, malonic acid, succinic acid, glutaric acid, brassylic acid, dodecane dioic acid, etc. Anhydrides of these acids also be used in the invention. Examples thereof are adipic anhydride, azelaic anhydride, sebacic anhydride, succinic anhydride, glutaric anhydride, etc. In the invention there can be used as a curing agent a substance capable of producing the above dibasic acid under curing conditions. Examples of such substances are polysebacic polyanhydride, polyazelaic polyanhydride, polydodecane dioic polyanhydride, etc., which are derived from intermolecular condensation of sebacic acid or azelaic acid.

The amount of the curing agent, aliphatic dibasic acids and anhydrides thereof, used relative to the acrylic resin having glycidyl groups may vary over a wide range in accordance with the number of glycidyl groups contained in the acrylic resin. Usually it is preferable to employ such curing agent in the range of 0.5 to 2.0 equivalent in terms of the carboxyl group contained therein per one equivalent of the glycidyl group contained in the acrylic resin. The most preferable amount thereof is in the range of 0.8 to 1.2 equivalent to the glycidyl group.

In preparing the powder coating composition of the present invention it is preferable to blend the acrylic resin having glycidyl groups with curing agent in a molten state at a temperature of lower than about 150°C, preferably 80° to 130°C, and solidify the blended material by cooling, followed by pulverization into fine powder having usually about 20 to about 150 $\mu$ of particle size. As mentioned before, no curing reaction occurs during the blending step in a molten state at a temperature of lower than about 150°C, so that homogeneous composition can be obtained. If desired, pigments, fillers, leveling agents, etc. can be added to the composition. In such a case these additives are added to the composition before or during the blending step. The blender used may be conventional one, such as heating roll, heating kneader, extruder etc. It is also possible to mix the resin and curing agent in the form of powder, but this process is not preferable because the particle sizes of the both substances are considerably different and adjustment thereof is difficult.

Excellent coating film can be obtained from the present powder coating composition, as disclosed before, so that the composition can be extensively used in various fields. For example, it is particularly suitable for coating automobiles, steel furniture, etc., in which beautiful appearance and durability are required. Further, it is also suitable for coating outdoor fences, etc., which must be highly resistant to weather.

The present composition can be applied to articles to be coated by the known methods conventional to the powder coating. The baking is conducted at a temperature of higher than 150°C, preferably 180° to 240°C to proceed the curing reaction.

For a better understanding of the invention examples are given below in which all parts and percentages are by weight unless otherwise specified.

EXAMPLES 1 – 6

In a 3-necked flask equipped with a stirrer and reflux condenser were placed methyl methacrylate, butyl arcylate, ethyl acrylate, glycidyl methacrylate, hydroxyethyl methacrylate and styrene in the amounts shown in Table I below in combination with 100 parts of toluene. To the mixture was added 1.5 parts of benzoyl peroxide and the resulting mixture was heated with stirring at 90° to 100°C. After 3 hours' heating 2.0 parts of benzoyl peroxide was added and the mixture was further kept at that temperature for 4 hours to complete the polymerization reaction. From the resulting reaction mixture the solvent used was distilled off almost completely at 120° to 140°C under atmospheric pressure and further at 140° to 150°C under abut 200 mm Hg. The copolymer thus obtained was pulverized into fine powder passing a 6-mesh sieves.

100 parts of the resultant copolymer, 9 parts of sebacic acid, 40 parts of titanium dioxide and 1 part of "Moda Flow" (trade mark, flowing agent of Monsant Chemical Co., U.S.A.) were kneaded in a molten state by a heating roll at 90°C for 10 minutes and after being cooled the kneaded mixture was pulverized into particles of 20 to 150 µ to produce powder coating composition.

Steel plate parkerized with zinc phosphate was coated with the resultant composition by electrostatic powder coating and the resulting coating was baked at 200°C for 20 minutes. The physical properties of the coating film thus obtained are shown in Table 2 together with the glass transition temperature of each copolymer.

Physical properties of the coating film were determined in accordance with the following method;
1. Smoothness of film
   JIS K-5400.6.1 (JIS means Japanese Industrial Standard)
2. Specular gloss
   A dark box is prepared which has a light source, a strip of white reflecting paper attached to an inner wall of the box and a peep hole formed in another wall of the box. The sample to be measured is placed on another inner wall of the dark box and is positioned 12 cm away from the reflecting strip, the arrangement being such that the light of the light source will be reflected from the reflecting strip to impinge on the coated surface of the sample so that the image of the reflecting strip can be observed through the peep hole. The strip of reflecting paper measures 3 cm in width and 8 cm in length and has 8 divisions equal in area and arranged side by side longitudinally of the strip, each of the divisions therefore measuring 3 cm by 1 cm. The first division at one extreme end includes subdivided halves positioned in paralled to the divisions. One subdivided portion at the extreme end, i.e., the first half, is colored in black, while the second half is left uncolored and therefore remains white. Similarly, the second division adjacent the first division includes four portions of equal area. The first quarter adjacent the above-mentioned white half portion and the third quarter are colored in black, with the other quarters left uncolored. Likewise, the remaining divisions include subdivided portions increasing in number toward the other end of the reflecting strip, where the eighth division includes 16 alternately black and white subdivided portions. Thus the reflector strip has alternate black and white subdivisions decreasing in width from division to division toward the other end. The specular gloss of samples is evaluated

TABLE 1

| No. | Monomer (parts) | | | | | |
|---|---|---|---|---|---|---|
| | Styrene | Methyl-methacrylate | Butyl-acrylate | Ethyl-acrylate | Glycidyl-methacrylate | Hydroxy-ethyl-methacrylate |
| Ex. 1 | 41.0 | 23.0 | 19.0 | 3.0 | 13.0 | 1.0 |
| Ex. 2 | 40.5 | 23.0 | 18.5 | 3.0 | 13.0 | 2.0 |
| Ex. 3 | 40.0 | 23.0 | 18.0 | 3.0 | 13.0 | 4.0 |
| Ex. 4 | 39.5 | 23.0 | 17.5 | 3.0 | 13.0 | 4.0 |
| Ex. 5 | 39.0 | 23.0 | 17.0 | 3.0 | 13.0 | 5.0 |
| Ex. 6 | 33.0 | 22.0 | 10.0 | 12.0 | 13.0 | 10.0 |
| Comparison Ex. 1 | 41.5 | 23.0 | 19.5 | 3.0 | 13.0 | 0 |
| Ex. 2 | 32.0 | 20.0 | 9.0 | 11.0 | 13.0 | 15.0 |

Table 2

| No. | Glass transition Temp.(°C) | Surface smoothness | Specular gloss | Erichsen test (mm) | Water resistance | Gloss (60°) of film | Salt spray test (mm) |
|---|---|---|---|---|---|---|---|
| Ex. 1 | 49 | Good | 4 | >7 | 100/100 | 93 | 3.0 |
| Ex. 2 | 50 | Excellent | 5 | >7 | 100/100 | 94.5 | 2.5 |
| Ex. 3 | 50 | Excellent | 6 | >7 | 100/100 | 95 | 1.0 |
| Ex. 4 | 50 | Excellent | 6 | >7 | 100/100 | 95 | 1.0 |
| Ex. 5 | 51 | Excellent | 5.5 | >7 | 100/100 | 94 | 2.0 |
| Ex. 6 | 51 | Excellent | 4.5 | >7 | 98/100 | 91 | 2.0 |
| Comparison Ex. 1 | 48 | Poor | 3.5 | >7 | 90/100 | 90 | 3.5 |
| Ex. 2 | 52 | Excellent | 4 | >7 | 20/100 | 86 | 2.0 | based on whether or not the black subdivision of a particular division can be distinctly distinguished from the white subdivision of the same division. More specifically, samples which permit clear discrimination between the black and white in the division subdivided into two are evaluated as 3 point, and samples which permit the observer to distinguish the black quarter from the white quarter are graded as 3 point. The evaluation point increases from division to division with the increase in the number of subdivisions. Thus samples with which the black and white subdivisions in the eighth division, i.e., in the division including 16 subdivisions, can be distinguished from each other are given the highest evaluation of 10 point.

3. Erichsen test

The coated plate was placed in a constant temperature and humidity chamber kept at 20°C and a humidity of 75 percent for one hour. Thereafter, the plate was set on Erichsen testing machine with the coating positioned outside. A punch having a radius of 10 mm was pushed outward predetermined distances in contact with the rear face of the plate at as uniform speed as possible of about 0.1 mm/sec. The pushed out portion of the plate was checked by the naked eye for cracking or peeling immediately after pushing out to determine the maximum distance (mm) of stroke of the punch causing no changes on the coating.

4. Water resistance

Each test panel was immersed into warmed water of 40°C for 3 months. Then the test panel was taken out from the warmed water and left to stand at room temperature for 1 hour. Thereafter, lines were cut at a right angle so deep as to reach the surface of the steel plate to obtain 100 of squares, 2mm × mm. Adhesive tape was stuck onto it, pressed uniformly with a uniform force, and peeled off rapidly. The numbers of remaining squares were counted to determine shown resistance shown by the following equation:

Evaluation = S/100

S: number of remaining squares

5. Gloss of film
JIS K-5400.6.7
6. Salt spray test
Test was conducted in accordance with ASTM B-117 at 35°C for 300 hours.

EXAMPLE 7

In the same manner as in Example 1 a copolymer having a glass transition temperature of 56.7°C was produced from 66 parts of methylmethacrylate, 18 parts of butylacrylate, 13 parts of glycidylmethacrylate and 3 parts of hydroxypropylacrylate. 100 parts of the resultant copolymer was mixed at room temperature for 10 minutes with 40 parts of polydodecane dioic polyanhydride, 30 parts of titanium dioxide and 1 part of "Moda Flow" (trade mark, flowing agent of Monsant Chemical Co., U.S.A.). The resultant mixture was then kneaded in an extruder at a temperature of 90°C for 5 minutes, and after being cooled, the kneaded mixture was pulverized into particles of 20 to 150 μ to produce powder coating composition.

Steel plate parkerized with zinc phosphate was coated with the resultant composition by electrostatic powder coating and the coating then baked at a temperature of 180°C for 30 minutes. The physical properties of the coating film are shown in Table 3.

Table 3

|  | Example 7 |
|---|---|
| Surface smoothness | Excellent |
| Specular gloss | 7 |
| Erichsen test (mm) | >7 |
| Salt spray test (mm) | 1 |
| Impact resistance (Dupont, ½" dia., 500 g, cm) | 35 |

EXAMPLES 8 to 10

In the same manner as described in Example 1 a copolymer having a glass transition temperature of 54.9°C was produced from 35 parts of styrene, 27 parts of methyl methacrylate, 16 parts of butyl acrylate, 17 parts of glycidyl methacrylate and 3 parts of hydroxyethyl methacrylate.

100 parts of the resultant copolymer was mixed at room temperature for 8 minutes with curing agents shown in Table 4 in combination with 20 parts of titanium dioxide and 0.5 part of "Moda Flow" (trade mark, the same as in Examples 1 to 7). The resultant mixture was then kneaded in an extruder at a temperature of 100°C for 5 minutes, and after being cooled, the kneaded mixture was pulverized into particles of 20 to 150 μ to produce powder coating composition.

In the samme manner as in Example 1 coating and baking were carried out using the above composition. The physical properties of the coating film thus obtained are shown in Table 4 below.

Table 4

| No. | Ex. 8 | Ex. 9 | Ex. 10 |
|---|---|---|---|
| Curing agent (parts) | Sebacic acid (12) | Dodecan dioic acid (14) | Polysebacic polyanhydride (15) |
| Appearance of film | Excellent | Excellent | Excellent |
| Specular gloss of film | 5 | 6 | 5 |
| Erichsen test (mm) | >7 | >7 | >7 |
| Water resistance | 100/100 | 100/100 | 100/100 |
| Gloss (60°) of film | 93 | 92 | 93 |
| Salt spray | 1 | 1 | 1.5 |
| Impact resistance (Dupont, ½" dia., 500 g, cm) | 30 | 30 | 40 |

Testing methods are the same as above except that water resistance was determined using the test piece immersed in worm water of 40°C for 6 months.

EXAMPLES 11 to 12

Using the monomers shown in Table 5 below three kinds of copolymers were prepared in the same manner as in Example 1. Powder coating compositions were produced from the resultant copolymers in the same manner as in Example 1 except that curing agents shown in Table 5 were used. The coating and baking were conducted in the same manner as in Example 1 using the above composition. The physical properties of the coating film are shown in Table 5.

Table 5

|  | Ex. 11 | Ex. 12 | Comparison Ex. 3 |
|---|---|---|---|
| Component of copolymer |  |  |  |
| Ethyl methacrylate (parts) | 75 | 78 | 92 |
| Lauryl methacrylate (parts) | 5 | — | — |
| Glycidyl methacrylate (parts) | 15 | 17 | 3 |
| Hydroxyethyl methacrylate (parts) | 5 | 5 | 5 |
| Glass transition temperature (°C) | 43 | 52 | 50 |
| Curing agent (parts) | Sebacic acid (11) | Sebacic acid (12) | Sebacic acid (3) |
| Appearance of film | Excellent | Excellent | Excellent |
| Specular gloss of film | 7 | 6 | 8 |
| Erichsen test (mm) | >7 | >7 | <1 |
| Gloss (60°) of film | 91 | 90 | 90 |
| Salt spray | 1.5 | 1 | 7 |
| Impact resistance (Dupont, ½" dia., 500 g. cm) | 30 | 40 | <5 |
| Gloss retention (60°) after 18 months exposure (%) | 80 | 75 | 2 |

The testing methods are the same manner as in Example 1.

EXAMPLE 13

In the same manner as described in Example 1, a copolymer having a glass transition temperature of about 55°C was produced from 32 parts of methyl methacrylate, 18 parts of acrylonitrile, 20 parts of methyl acrylate, 6 parts of butyl acrylate, 23 parts of glycidyl methacrylate and 1 part of hydroxyethyl methacrylate.

100 parts of the resultant copolymer was mixed at room temperature for 10 minutes with 30 parts of titanium dioxide, 15 parts of sebacic acid and 1 part of "Moda Flow" mark, the same as in Examples 1 to 7). The resultant mixture was then kneaded in an extruder at 90°C for 5 minutes, and after being cooled, the kneaded mixture was pulverized into particles of 20 to 150 μ to produce powder coating composition. The coating and baking were conducted in the same manner as in Example 1 using the above composition. The physical properties of the coating film are shown in the appended Table 6.

EXAMPLE 14

In the same manner as described in Example 1, a copolymer having a glass transition temperature of 55°C was produced from 49 parts of methyl methacrylate, 29 parts of vinyl toluene, 7 parts of butyl acrylate, 15 parts of glycidyl methacrylate and 3 parts of 2-hydroxypropyl methacrylate.

100 parts of the resultant copolymer was mixed at room temperature for 10 minutes with 30 parts of titanium dioxide, 12 parts of dodecane dioic acid and 1 part of "Moda Flow" (trade mark, the same as in Examples 1 to 7). The resultant mixture was then kneaded in an extruder at 85°C for 5 minutes, and after being cooled, the kneaded mixture was pulverized into particles of 20 to 150 μ to produce powder coating composition. The coating and baking were conducted in the same manner as in Example 1 using the above composition. The physical properties of the coating film are shown in Table 6.

Table 6

|  | Ex. 13 | Ex. 14 |
|---|---|---|
| Appearance of film | Excellent | Excellent |
| Specular gloss of film | 5 | 4 |
| Gloss (60°) of film | 89 | 95 |
| Erichsen test | >7 | >7 |
| Salt spray | 2 | 3 |
| Impact resistance (Dupont, ½" dia., 500 g. cm) | 40 | 30 |

EXAMPLE 15

In the same manner as in Example 1 100 parts of the copolymer the same as in Example 3 was mixed with the predetermined amounts of polysebacic polyanhydride, 40 parts of titanium dioxide and 1 part of "Moda Flow" (trade mark, the same as in Examples 1 to 7) and the mixture was made into powder coating composition. The coating and baking were carried out in the same manner as in Example 1 using the above composition. The physical properties of the resultant coating film are shown in the appended Table 7.

Table 7

|  | Comparison Ex. 4 | Ex. 15 | Comparison Ex. 5 |
|---|---|---|---|
| Polysebacic polyanhydride (equivalent) | 3.6 parts (0.4) | 13.5 parts (1.5) | 36 parts (4.0) |
| Smoothness of film | Excellent | Excellent | Poor |
| Gloss (60°) of film | 93 | 95 | 69 |
| Erichsen test (mm) | <1 | >7 | >7 |
| Water resistance | 20/100 | 100/100 | 90/100 |
| Salt spray (mm) | 6 | 1 | 3 |

EXAMPLES 16 TO 17

Copolymers comprising the following components and having the following glass transition temperature were prepared in the same manner as in Example 1.

The powder coating compositions were prepared in the same manner as in Example 1 except that kneading temperature and curing agent were varied as shown in Table 8.

The coating and the baking were conducted in the same manner as in Example 1 except that baking temperature was varied.

The physical properties of the resulting coating film are shown in the Table 8.

Table 8

|  | Ex. 16 | Comparison Ex. 6 | Ex. 17 | Comparison Ex. 7 |
| --- | --- | --- | --- | --- |
| Component of copolymer |  |  |  |  |
| Methyl methacrylate (parts) | — | — | 5 | 38 |
| Ethyl methacrylate (parts) | 75 | 69 | — | — |
| iso-Butyl methacrylate (parts) | — | — | 40 | 5 |
| Lauryl methacrylate (parts) | 5 | 11 | — | — |
| Styrene (parts) | — | — | 33 | 35 |
| Glycidyl methacrylate (parts) | 15 | 15 | 17 | 17 |
| Hydroxyethyl methacrylate (parts) | 5 | 5 | 5 | 5 |
| Glass transition temperature (°C) | 43 | 32 | 80 | 93 |
| Curing agent |  |  |  |  |
| Sebacic acid (parts) | 11 | 11 | — | — |
| Dodecane dioic acid (parts) | — | — | 14 | 14 |
| Kneading temperature (°C) | 90–100 | It is impossible to crush the mixture | 110 | 120 |
| Baking temperature (°C-min) | 200–20 |  | 200–20 | 200–20 |
| Appearance of film | Excellent | — | Good | Poor |
| Specular gloss of film | 7 | — | 6 | 3.5 |
| Erichsen test (mm) | >7 | — | >7 | 5 |
| Impact resistance (Dupont, ½" dia., 500 g, cm) | 30 | — | 35 | 20 |
| Salt spray test (mm) | 1.5 | — | 2 | 3 |

What we claim is;

1. A thermosetting acrylic powder coating composition which comprises an acrylic resin having glycidyl groups in the molecule and a glass transition temperature of 40° to 85° C and at least one of aliphatic dibasic acids, anhydrides thereof and substances producing said dibasic acids under a curing condition in an amount of 0.5 to 2.0 equivalent in terms of the carboxyl group contained therein per one equivalent of the glycidyl group contained in the acrylic resin; said acrylic resin being a copolymer of 1. 50 to 94.5 weight percent of at least one species selected from the group consisting of (a) alkyl esters of acrylic acid or methacrylic acid represented by the formula of

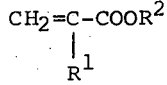

in which $R^1$ is hydrogen atom or methyl group and $R^2$ is an alkyl group having 1 to 17 carbon atoms and (b) a 1 : up to 1.5 weight ratio mixture of said alkyl esters and other vinyl monomers 2. 0.5 to 10 weight percent of at least one of hydroxyalkyl esters of acrylic acid or methacrylic acid represented by the formula of

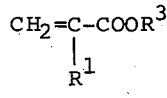

in which $R^1$ is the same as above, $R^3$ is a hydroxyalkyl group having 1 to 4 carbon atoms and 3. 5 to 40 weight percent of at least one of glycidyl acrylate and glycidyl methacrylate; and said aliphatic dibasic acid having the formula of

HOOC—R—COOH in which R is a saturated aliphatic hydrocarbon group having 4 to 11 carbon atoms.

2. The thermosetting acrylic powder coating composition according to claim 1, in which said acrylic resin has a glass transition temperature of 45° to 55° C.

3. The thermosetting acrylic powder coating composition according to claim 1, in which said copolymer comprises 62 to 88 weight percent of at least one species selected from the group consisting of (a) said alkyl esters and (b) a 1 : up to 1.5 weight ratio mixture of said alkyl esters and other vinyl monomers, 2 to 8 weight percent of at least one of said hydroxyalkyl esters and 10 to 30 weight percent of at least one of said glycidyl esters.

4. The thermosetting acrylic powder coating composition according to claim 1, in which said copolymer comprises 50 to 94.5 weight percent of at least one of said alkyl esters, 0.5 to 10 weight percent of at least one of said hydroxyalkyl esters and 5 to 40 weight percent of said glycidyl esters.

5. The thermosetting acrylic powder coating composition according to claim 1, in which said copolymer comprises 50 to 94.5 weight percent of 1 : up to 1.5 weight ratio mixture of said alkyl esters and other vinyl monomers, 0.5 to 10 weight percent of at least one of said hydroxyalkyl esters and 5 to 40 weight percent of said glycidyl esters.

6. The thermosetting acrylic powder coating composition according to claim 5, in which said vinyl monomer is one member selected from the group consisting of styrene, acrylonitrile, vinyl acetate and vinyl toluene.

7. The thermosetting acrylic powder coating composition according to claim 5, in which said mixture ratio of said alkyl esters and vinyl monomer is 1 : up to 1.

8. The thermosetting acrylic powder coating composition according to claim 1, in which said aliphatic dibasic acid is one species selected from the group consisting of adipic acid, pimelic acid, suberic acid, azelaic acid, sebacic acid, dodecane dioic acid, glutaric acid, brassylic acid and malonic acid.

9. The thermosetting acrylic powder coating composition according to claim 1, in which said aliphatic dibasic acid anhydride is one species selected from the group consisting of adipic anhydride, azelaic anhydride and sebacic anhydride.

* * * * *

Notice of Adverse Decision in Interference

In Interference No. 99,694, involving Patent No. 3,876,587, K. Matsui and M. Kamimura, POWDER COATING COMPOSITIONS, final judgment adverse to the patentees was rendered Mar. 3, 1981, as to claims 1-8.
[*Official Gazette August 25, 1981.*]